2/23/88 331 XR 4,726,658

United States Patent [19]

Nishimura et al.

[11] Patent Number: 4,726,658

[45] Date of Patent: Feb. 23, 1988

[54] EFFECTIVE VALUE VOLTAGE STABILIZER FOR A DISPLAY APPARATUS

[75] Inventors: Toshio Nishimura, Jyoyo; Masakazu Saka, Mie, both of Japan

[73] Assignee: Sharp Kabushiki Kaisha, Osaka, Japan

[21] Appl. No.: 613,212

[22] Filed: May 23, 1984

[30] Foreign Application Priority Data

May 31, 1983 [JP] Japan ........................ 58-98591

[51] Int. Cl.[4] ........................ G02F 1/13; G05F 5/00

[52] U.S. Cl. ........................ 350/331 R; 350/332; 323/283; 323/906

[58] Field of Search ........................ 350/331 R, 332; 323/299, 906, 283

[56] References Cited

U.S. PATENT DOCUMENTS 2,613,346 10/1952 Robinson ........................ 323/299

4,092,712 5/1978 Harrigill, Jr. et al. ......... 323/906 X 4,291,266 9/1981 Portmann ........................ 323/906 X 4,375,662 3/1983 Baker ........................ 323/299 X 4,475,031 10/1984 Mockovciak, Jr. ......... 350/331 R X 4,499,525 2/1985 Mallory ........................ 323/299 X 4,523,217 6/1985 Jibu ........................ 307/311 X

*Primary Examiner*—John K. Corbin

*Assistant Examiner*—Richard F. Gallivan

*Attorney, Agent, or Firm*—Birch, Stewart, Kolasch & Birch

[57] ABSTRACT

A voltage stabilizer receiver power from a power circuit for inputting a power source voltage. The voltage stabilizer changes the width of pulses in accordance with the changes in the effective value of the power source voltage and stabilizes the effective value of an applied voltage to a display regardless of the change in the effective value of the power source voltage by subtracting this pulse from pulses comprising the display drive waveforms.

5 Claims, 10 Drawing Figures

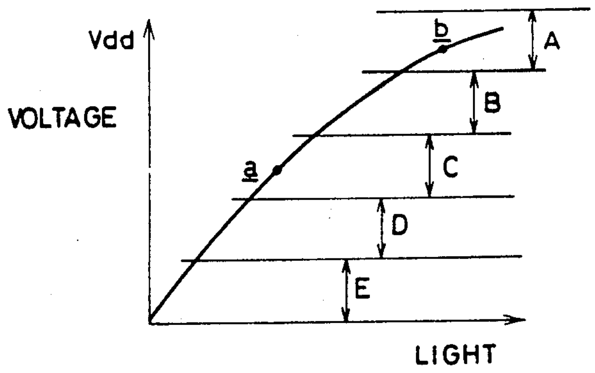
FIG.4
FIG.5
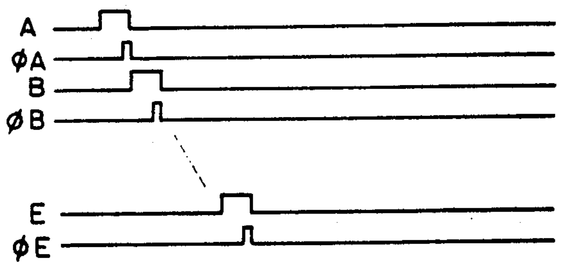
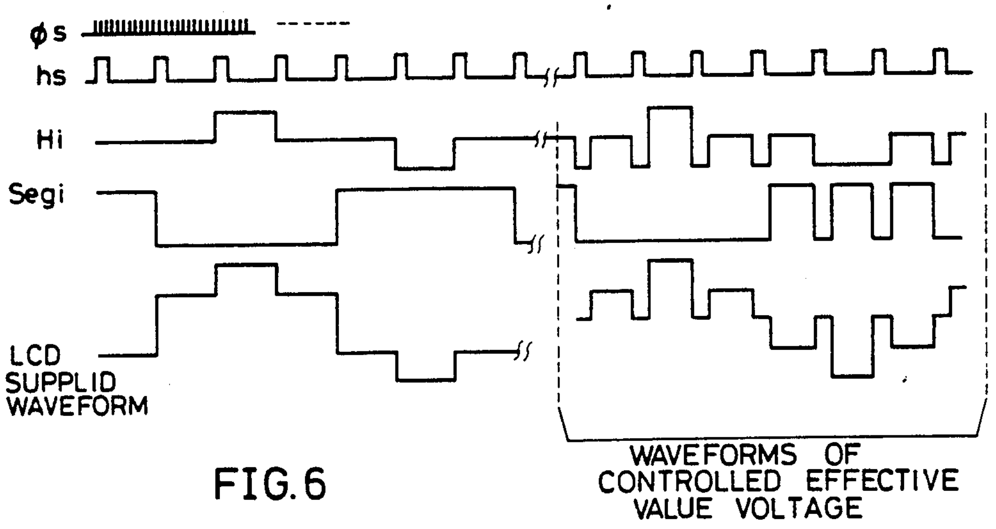
FIG.6

FIG.7 (1)
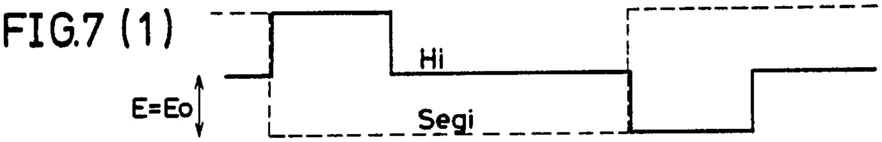
FIG.7 (2)
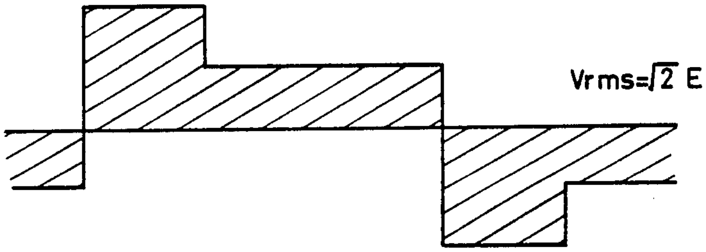
FIG.7 (3)
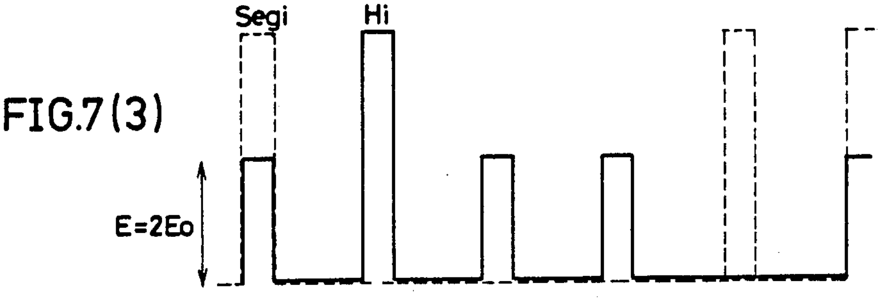
FIG.7 (4)
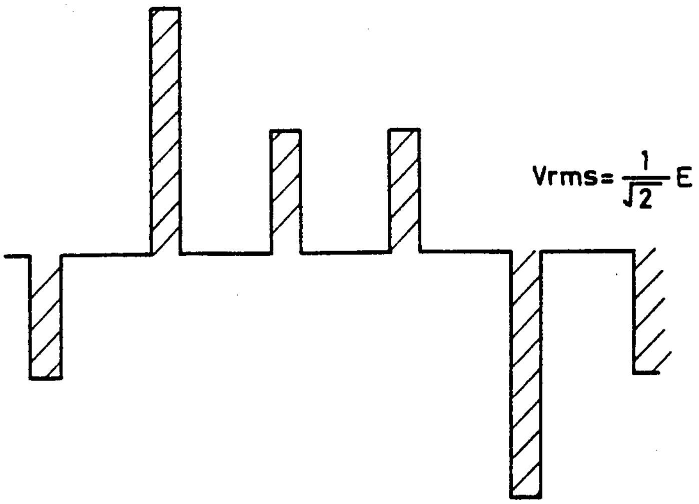

EFFECTIVE VALUE VOLTAGE STABILIZER FOR A DISPLAY APPARATUS

BACKGROUND OF THE INVENTION

The present invention relates to a display control circuit and, more particularly, to an effective value voltage stabilizer for a display control circuit in which a power voltage varies over a wide range, and a driving method by the circuit for an electronic apparatus with a solar battery.

FIG. 1 shows a block diagram of the conventional liquid crystal display electronic calculator. SB designates a solar battery, LSI designates a large scale integrated circuit for constructing internal circuits of an electronic calculator, KEY designates a key input device, and LCD designates a liquid crystal display device.

The output voltage of the solar battery SB varies widely in response to incident light. Accordingly, a voltage stabilizer is conventionally provided for stabilizing an applied voltage to compensate for the output voltage of the solar battery SB. The voltage stabilizer comprises a resistance R and a light emitting diode LED. Forward voltage of the light emitting diode LED is used for stabilizing the speed voltage.

FIG. 2 shows a relationship between light and an output voltage A of the solar battery SB or a voltage B supplied to the LSI. L0 designates the minimum light required to drive the display.

In the conventional liquid crystal display apparatus including a solar battery SB, it is necessary that the voltage stabilizer is provided separately from the LSI. The voltage stabilizer is expensive because the LED is included in the voltage stabilizer. Further, packaging space for packaging the voltage stabilizer is additionaly required, so that a compact apparatus may not be assembled.

SUMMARY OF THE INVENTION

It is an object of the present invention to provide an effective value voltage stabilizer for a display apparatus for substantially stabilizing an effective value voltage applied to a display by varying display driving signal waveforms in conformance with the output voltage of a power source such as a solar battery.

It is another object of the present invention to provide a large scale integrated circuit (LSI) including an effective value voltage stabilizer for substantially stabilizing an effective value voltage applied to a display by varying display driving signal waveforms in conformance with the output voltage of a power source such as a solar battery.

It is still another object of the present invention to provide an electronic apparatus including an effective value voltage stabilizer for substantially stabilizing an effective value voltage in conformance with the output voltage of a power source such as a solar battery.

It is a further object of the present invention to provide a liquid crystal driving method for driving by a stabilized effective value voltage applied to a display which is stabilized by varying display driving signal waveforms in conformance with the output voltage of a power source.

It is a still further object of the present invention to provide a liquid crystal display electronic apparatus including an effective value voltage stabilizer for substantially stabilizing an effective value voltage applied to a liquid crystal display by varying liquid crystal driving signal waveforms in conformance with the output of a power source such as a solar battery.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a voltage stabilizer comprises power input means for inputting a power source voltage and voltage stabilizer means for changing the intervals of pulses in accordance with the changes in the effective value of the power source voltage and stabilizing the effective value of an applied voltage regardless of the change in the effective value of the power source voltage.

The voltage stabilizing means comprises flip-flop means, preset counter means, a gate control circuit, and a reference voltage generator.

According to another embodiment of the present invention, an electronic apparatus comprises power means for supplying a power voltage to the apparatus, stabilizing means responsive to said power source for substantially stabilizing an effective value of an applied voltage, and display means responsive to said stabilizing means for receiving the applied voltage and for displaying information.

The display means is a liquid crystal display, and the power means is a solar battery. The stabilizing means is included in a large scale integrated circuit. The stabilizing means comprises detecting means for detecting a power voltage developed by said power source, a flip-flop means, preset counter means, a gate control circuit, and a reference voltage generator.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 4 shows a relationship graph between a power voltage of the solar battery SB and detecting voltage ranges;

FIG. 5 shows a relationship between the signals of the gates A–E of the anaıog switch 2 and those of the latches $\phi$A–$\phi$E of the latch circuit 5;

FIG. 6 is a time-chart of a signals hs, $\phi$s, segment electrode driving signal Segi, a common electrode driving signal Hi, a LCD driving signal, showing standard signals and controlled signals;

FIGS. 7(1) and 7(3) show waveform diagrams of outputs Hi and Segi of LCD control logic circuits 9 and 10, respectively; and FIGS. 7(2) and (4) show waveform diagrams of voltages supplied to a liquid crystal display.

DETAILED DESCRIPTION OF THE INVENTION

Figure 1:
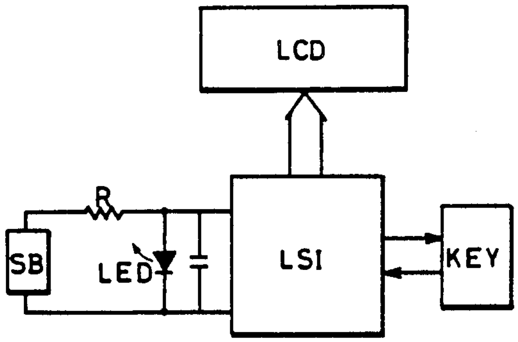
FIG.1 PRIOR ART
FIG. 1 shows a block diagram of the conventional liquid crystal display electronic calculator.
Figure 2:
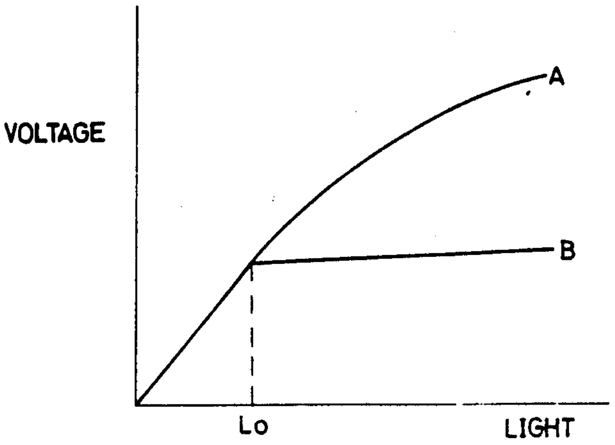
FIG.2 PRIOR ART
FIG. 2 shows a relationship between light and an output voltage A of the solar battery SB or a voltage B supplied to the LSI.
Figure 3:
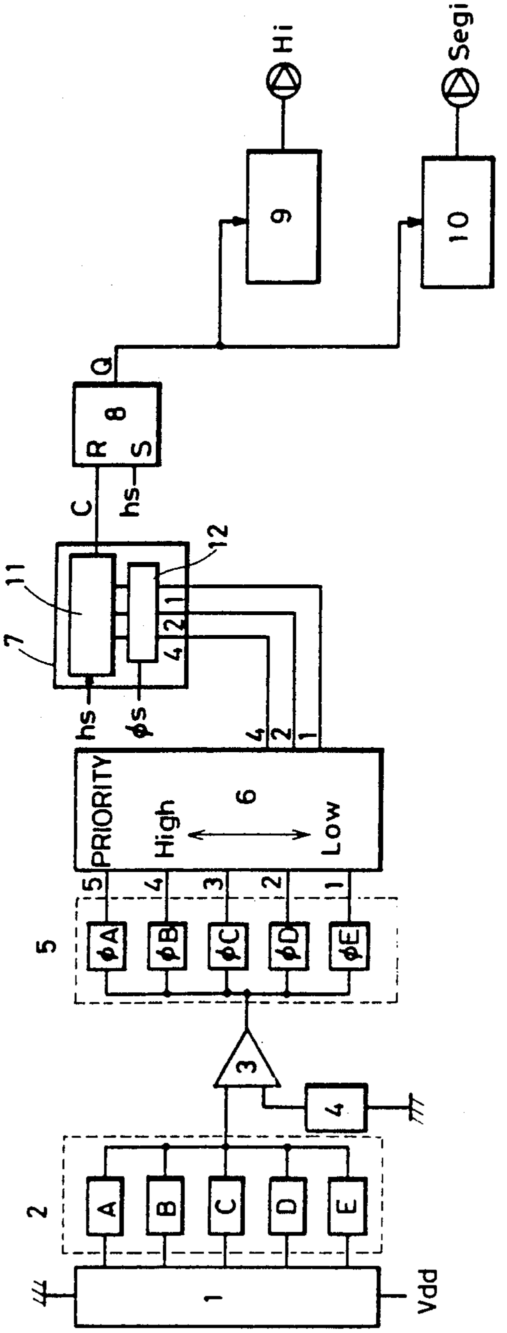
FIG. 3 shows a block diagram of an effective value voltage stabilizer according to an embodiment of the present invention.

Referring to FIG. 3, there is shown a block diagram of an effective value voltage stabilizer according to an embodiment of the present invention comprising a voltage detector 1, an analog switch (tranformer gates) 2, a comparator 3, a reference voltage generator 4, a latch circuit 5, a priority encoder 6, a preset counter 7, an R/S flip-flop 8, a control logic circuit 9 for common electrodes of a display, and a control logic circuit 10 for segment electrodes of the display. The display is assumed to be LCD, but is not limited thereto.

In an embodiment of the present invention, the control logic circuits 9 and 10 output LCD driving signal waveforms for the common and segment electrodes, respectively, and the LCD driving signal waveforms are controlled in response to the output of the R/S flip-flop 8 decided by output voltages of a power source such as a solar battery in which a power voltage varies over a wide range, and the output of preset counter 7.

The voltage detector 1 comprises resistances in series, and detects the output voltage Vdd from the power source such as a solar battery. The output voltage Vdd from the power source is inputted in a timesharing manner into some of gates A–E of the analog switch 2 in response to the voltage value ranges as shown in FIG. 4. The output (the voltage of each output portion) of the voltage detector 1 is inputted in timesharing manner into the comparator 3 via the analog switch (the transformer gates) 2. The gates A–E of the analog switch 2 are sequentially selected in alphabetical order. For example, while the gates A–E are sequentially activated, if the output voltage Vdd from the power source is a voltage designated by a point a within a voltage range C, the gates A and B provide a "0" level signal and the gates C–E are selected to output the output voltage Vdd. If the output voltage Vdd from the power source is a voltage designated by a point b within a voltage range A, all the gates A–E of the analog switch 2 are selected to output the power voltage Vdd.

The voltage Vdd outputted from some of the gates A–E of the analog switch 2 to the comparator 3 is compared with a reference voltage generated from the reference voltage generator 4. When the voltage Vdd is greater than the reference voltage, the output from the comparator 3 is a "1" level signal.

The output "1" level signal from the comparator 3 is inputted and stored into latch circuit 5. The latch circuit 5 comprises latches $\phi$A–$\phi$E corresponding to the gates A–E of the analog switch 2, respectively. The latch circuit 5 select latches $\phi$A–$\phi$E in the timesharing manner and synchronously with the gates A–E of the analog switch 2. The outputs of the gates A–E are inputted into the latches $\phi$A–$\phi$E via the comparator 3, respectively.

The reference voltage generator 4 uses a zener effect or a forward voltage drop of a PN junction, and is included into an LSI (Large Scale Integrated circuit).

As stated above, when the output voltage Vdd from the power source is the voltage designated in the point a within the voltage range C, the comparator 3 outputs the "1" level signal when the output voltage Vdd is greater than the reference voltage from the reference voltage generator 4, so that the latches $\phi$C–$\phi$E of the latch circuit 5 are set in response to the output of the gates C–E, respectively, and the latches $\phi$A–$\phi$B of the latch circuit 5 are reset in response to the output of the gates A and B, respectively.

The priority encoder 6 provides priority to a maximum-weight value from the values inputted since some of the latches of the latch circuit 5 are set under the condition that the comparator 3 outputs the "1" level signal when the output voltage Vdd from the power source is greater than the reference voltage of the reference voltage generator 4.

In the embodiment of the present invention, the priority encoder 6 outputs a 3 bit signal ("001", "010", "011", "100", "101" in the binary coded decimal corresponding to "1", "2", "3", "4" and "5" in the decimal code, respectively) in response to the output voltage of the power source.

The preset counter 7 is reset by a clock signal hs, and counts up to the preset value by a clock signal $\phi$s, and then, the preset counter 7 outputs a carry C. The input terminals of the preset counter 7 are connected to the encoder output terminals of the priority encoder 6. The preset counter 7 comprises a 3-bit binary counter 11 and a gate circuit 12.

The carry C of the preset counter 7 is inputted into a reset input R of the R/S flip-flop 8. The R/S flip-flop 8 is set by a set signal hs. The set signal hs is shown in FIG. 6. The set signals hs are generated to change the pulse timings of the liquid crystal display driving signal waveforms.

The output signals Q of the R/S flip-flop 8 are inputted into the LCD control logic circuits 9 and 10 of the common electrodes and the segment electrodes, respectively, and the LCD driving signal waveforms are controlled as shown in FIG. 6.

Next, the actual operation will be described as follows.

FIG. 4 shows a relationship table between an output voltage from a power source and detecting voltage ranges. If the output voltage Vdd from the power source is the voltage designated in the point a within the voltage range C, the voltage Vdd is detected by the voltage detector 1. As described above, the gates A–E of the analog switch 2 are selected in alphabetical order, and the output of the voltage detector 1 is inputted in the timesharing manner into the gates A–E of the analog switch 2 in response to the voltage ranges as shown in FIG. 4.

Because the output voltage Vdd from the power source is the voltage designated in the point a within the voltage range C, the output Vdd of the voltage detector 1 is inputted into the gates C, D, and E. The output "0" level of the voltage detector 1 is inputted into the gates A and B of the analog switch 2. The output of the gates A–E of the analog switch 2 are inputted in the timesharing manner into the comparator 3.

The voltage value inputted into the comparator 3 is compared with the reference voltage from the reference voltage generator 4. Therefore, the comparator 3 outputs the "1" level signal when inputting the voltage Vdd of the gates C–E. The comparator 3 outputs the "0" level signal when inputting the "0" level signal from the gates A and B.

As the point a is within the voltage range C, the latches $\phi$C, $\phi$D, $\phi$E of the latch circuit 5 are set and the latches $\phi$A and $\phi$B are reset. The outputs of the latches $\phi$A–$\phi$E of the latch circuit 5 are inputted into the priority circuit 6, and a value corresponding to the output of the latch $\phi$C is outputted with a priority from the priority encoder 6. Accordingly, the priority encoder 6 outputs a "011" in the binary coded decimal or a "3" in the decimal code.

When the voltage Vdd is the voltage designated in the point b within the voltage range A, the latches φA–φE of the latch circuit 5 are all set, and a value corresponding to the output of the latch φA is outputted with the priority from the priority encoder 6. Accordingly, the priority encoder 6 outputs a "101" in the binary coded decimal or a "5" in the decimal code.

FIG. 5 shows a relationship between the signals of the gates A–E of the analog switch 2 and those of the latches φA–φE of the latch circuit 5.

A sampling may be done once for about every 100–500 ms during the time when the signals are generated from the gate A to the gate E and from the latch φA to the latch φE. The time of about 100–500 ms can be changed depending on the response time of LCD and the power condenser characteristics.

The preset counter 7 is reset to change the pulse timings of the LCD driving signal waveforms by varying the signal hs, and counts up still when presetting the clock signal φs, and then, the preset counter 7 generates and outputs the carry C. On the other hand, the clock signal φs is counted from the change of the pulse timings of the LCD driving signal waveforms to a value preliminarily defined by the output of the priority encoder 6, and the output Q of the R/S flip-flop 8 is continuously set to the "1" level signal when counting. During the time that the output Q is set into the "1" level, both of the outputs Hi and Segi show a low level as shown in FIG. 6, and the voltage supplied to the liquid crystal is zero. Therefore, the effective value voltage supplied to the liquid crystal is controlled as a whole.

In this embodiment, a ¼ duty-⅓ bias waveform is exemplified as the LCD driving signal waveform. FIGS. 7(1)-7(4) show a principle for controlling the effective value voltage.

The waveform of the output Hi of the LCD control logic 9 is shown by a solid line, and the waveform of the output Segi of the LCD control logic 10 is shown by a dotted line in FIG. 7(1), respectively. FIG. 7(2) shows a waveform diagram of a voltage supplied to the liquid crystal display. The effective value voltage Vrms of FIG. 7(2) is applied by $\sqrt{2}\cdot E0$, where E0 is an output voltage of the power source.

When the power voltage E0 is doubled (E=2E0), the effective value voltage Vrms is $2\sqrt{2}\cdot EO$ if the waveforms Hi and Segi of the common and segment electrodes are as shown in FIG. 7(1), so that the effective value voltage as shown in FIG. 7(2) is doubled and the doubled effective value voltage is supplied to the LCD.

To calculate the waveforms having the effective value voltage as shown in FIG. 7(2), the effective value voltage Vrms are set into $Vrms=\sqrt{2}\cdot E0=@\cdot 2\cdot E0$, and a variable @ may be calculated. Accordingly, the variable @ is $1/\sqrt{2}$ by calculating, and the waveform, pulses controlled, having the effective value voltage $Vrms=(1/\sqrt{2})\cdot E$ becomes as shown in FIGS. 7(3) and 7(4).

If the power voltage Vdd is n times (n≧1), the effective value voltage is stabilized when a first ratio of disabling the applied voltage is $(1-1/n^2)$ or a second ratio of enabling the applied voltage is set to $(1/n^2)$. The first ratio and the second ratio are decided by the output of the priority encoder 6. The standard driving waveforms and values are preliminarily defined. The standard voltages are compared with the inputted voltage to modify and select the 1st and 2nd ratios.

To respond to the output of the priority encoder 6 (5 types from "001" to "101" in the binary coded decimal in the embodiment of the present invention), the preset counter 7 comprises means for selecting to increase or decrease the period of applying the voltage to the LCD by reducing or increasing the pulse width of the voltage, respectively.

When a doubled voltage of the selected standard voltage is applied, the pulse enabling period of the effective value voltage is selected to be a quarter of the standard pulse enabling period. In other words, the pulse disabling period of the effective value voltage is selected to be three quarters of the standard pulse enabling period. According to the embodiment of the present invention, the intervals of pulses applied to the LCD in accordance with the changes in the effective value of the power source voltage are changed by the voltage stablizer, and the effective value of the applied voltage is stabilized regardless of the changes in the effective value of the power source voltage.

When the output voltage from the power source is larger than the standard voltage, the pulse width of the applied voltage is reduced.

Therefore, a period for counting by the preset counter 7 and detecting voltage ranges of the voltage detector 1 are selected. For example, when the period for counting by the preset counter 7 is integral times, an interval of each of the detecting voltage ranges becomes an irregular interval. If the interval of each of the detecting voltage ranges is set as a regular interval, the values outputted from the priority encoder 6 are not in integral times relationship.

The resistances for constructing the voltage detector 1 may be bleeder resistances for a liquid crystal power circuit.

When the voltage detector 1 is included into the LSI, the resistances of the voltage detector 1 are diffusion resistances.

In the diffusion resistances, although the current loss is high, a switching transistor is provided for switching on/off the bleeder resistances. They are switched on/-off, selectively, to reduce the current loss.

The latch 5 is set in response to the output of the comparator 3, so that the voltage detector 1 may not be always operated.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a display drive circuit including display drive means for driving a display with display drive waveforms formed of drive pulses, said drive waveforms being developed from voltage supplied from a power source, an effective drive voltage stabilizer comprising:

means for sensing said voltage developed from said power source and developing a binary representation of the relative value of said voltage;

means, responsive to said binary representation, for supplying a control signal representative of the period of each said drive pulse to said display drive means, said display drive means being responsive to said control signal to control the period of each said drive pulse.

2. The drive voltage stabilizer of claim 1 wherein said control signal has a pulse width which varies in proportion to said binary representation;

said display drive means reducing the pulse width of each said drive pulse by the width of said control signal to thereby produce drive pulses having a pulse width which decreases with increasing supply voltage developed by said voltage source.

3. The electronic apparatus of claim 1, wherein the display is a liquid crystal display.

4. The electronic apparatus of claim 1, wherein said power source is a solar battery.

5. The electronic apparatus of claim 1, wherein said stabilizing means is included within a large scale integrated circuit.

* * * * *